(12) United States Patent
Herscu

(10) Patent No.: US 7,574,692 B2
(45) Date of Patent: Aug. 11, 2009

(54) METHOD FOR BUILDING COMPONENT-SOFTWARE FOR EXECUTION IN A STANDARDS-COMPLIANT PROGRAMMING ENVIRONMENT

(76) Inventor: Adrian Herscu, Stern 65/30, Jerusalem, 96750 (IL)

( * ) Notice: Subject to any disclaimer, the term of this patent is extended or adjusted under 35 U.S.C. 154(b) by 417 days.

(21) Appl. No.: 10/991,493

(22) Filed: Nov. 19, 2004

(65) Prior Publication Data

US 2007/0256055 A1    Nov. 1, 2007

(51) Int. Cl.
*G06F 9/44*    (2006.01)
*G06F 9/45*    (2006.01)

(52) U.S. Cl. .................. 717/116; 717/114; 717/127; 717/131; 717/137

(58) Field of Classification Search .................. None
See application file for complete search history.

(56) References Cited

U.S. PATENT DOCUMENTS

| | | | |
|---|---|---|---|
| 7,143,101 B2 * | 11/2006 | Oliver et al. ................. | 707/101 |
| 2001/0029605 A1 * | 10/2001 | Forbes et al. .................. | 717/11 |
| 2003/0055806 A1 * | 3/2003 | Wong et al. .................... | 707/1 |
| 2003/0056022 A1 * | 3/2003 | Carlson et al. .............. | 709/315 |
| 2003/0200349 A1 | 10/2003 | Hansen | |

OTHER PUBLICATIONS

International Search Report published May 26, 2006 for PCT/IL2005/001224 filed Nov. 17, 2005.
International Preliminary Report on Patentability published May 22, 2007 for PCT/IL2005/001224 filed Nov. 17, 2005.
Int'l Business Machines Corp: "Generating java code from . . . an XSL stylesheet", Research Disclosure, Mason Pub., GB, vol. 446, No. 153, Jun. 2001, XP007128459.
Int'l Business Machines Corp: "XML translation for block structured languages", Research Disclosure, Mason Pub, GB, vol. 444, No. 176, Apr. 2001, XP007128074.

* cited by examiner

*Primary Examiner*—Lewis A Bullock, Jr.
*Assistant Examiner*—Jason Mitchell

(57) ABSTRACT

Richer programming platforms mean easier application development. In order to achieve richer programming platforms, cooperation between lots of developers is necessary. The optimal situation is when developers can freely use each other's software components, without central management. Traditional programming platforms (COM, XP-COM, Java2 and .NET) almost reached this point, excluding situations when components compatible with different programming platforms must be integrated into the same application. An additional problem of the traditional programming platforms is their dependency on some non-standard runtime support. In a Web-application scenario, it cannot be assumed that support for every traditional programming platform would be available on any client machine. Therefore, the need for a system and a method for building, deploying and running component-software in a standards-compliant programming environment.

18 Claims, 7 Drawing Sheets

METHOD FOR BUILDING COMPONENT-SOFTWARE FOR EXECUTION IN A STANDARDS-COMPLIANT PROGRAMMING ENVIRONMENT

BACKGROUND

This invention relates to a method for creating and executing computer programs. More specifically, the present invention relates to programming models and object-oriented application frameworks that are designed to facilitate the creation of distributed componentized computer programs and to support their execution in a standards-based programming environment, such as the Web-browser.

The client/server architecture describes the relationship between two computer applications in which one application, the client, makes a service request from another application, the server, which fulfills the request. Although the client/server architecture can be used by applications within a single computer, it is most commonly used as a method for establishing the relations between different computers, which are interconnected via a computer network. In these cases the client/server architecture provides a convenient method for efficiently connect applications that are distributed across different locations. A specific type of client/server architecture is the Web, in which Web-browsers requests services from Web-servers through a set of interconnected computer networks.

It is well known to skilled professionals that in order to increase efficiency, and interactivity of a client/server application, presentation operations must be done entirely at client-side. However, complete presentation management at client-side, demands increasing the complexity of the client-side software. While the average computing capacity of the common client-side computer that activates Web-applications is increasing rapidly, most of the present day solutions for Web-applications cannot fully exploit the presentation capabilities available at client-side. Due to severe security and compatibility issues there are only few solutions that employ one of the traditional (proprietary) programming platforms at client-side.

The Web-programming platform is a standard, public and widely accepted set of software standards. Web-applications that strictly adhere to these standards are guaranteed to perform well in a heterogeneous network like the Internet. The Web-programming platform derives from the document distribution service, known as the World Wide Web (WWW), which is a document-oriented programming model. In a document-oriented process, the presentation tier is divided between client-side and server-side. That is because first generation browsers were not programmable, so presentation load was handled entirely at server-side and browsers of the generations that followed do support programming, but to a limited degree that varies from one vendor to the next, so the need to compensate for their limitations at server-side still exists.

The server-side process is defined by a set of templates, which are used to dynamically generate documents as requested by clients (some of the most widely used technologies are ASP, JSP and PHP). These templates contain a combination of programming languages, which are processed partly, at the server-side (server-scripts and database-scripts) and partly at client-side (client-scripts and presentation-tags). The document-oriented programming model fosters tight coupling between client-side and server-side code, which leads to the inability to reuse presentation-code across server applications; programmers are required to reinvent presentation mechanisms and users get inconsistent interfaces. Moreover, it is extremely hard to create advanced presentation mechanisms, such as are available for desktop applications, because it is impossible to rely on already developed code components. By relying only on presentation primitives, the developers must divide the presentation across a number of documents. This creates more problems: the display flickers when users move to a different document and user-sessions need to be managed server-side, leading to non-scalable servers. Another drawback is that the generated presentation documents (known as HTML documents) contain an unpredictable mixture of presentation code, presentation tags and unstructured data. This makes it impossible to reliably extract data from Web-servers.

In order to solve a part of the problems mentioned above, new Web-standards were developed: a uniform method for structured data representation/validation/transformation (XML/XSD/XSLT), a protocol for service-oriented communications (SOAP), a language for service description (WATSDL) and a mechanism for service location and registration (UDDI). These standards form a service-oriented model, which is seated on top of the previous document-oriented model, thus naturally extending it.

The service-oriented model enables separating the client-code from the server-code. According to this model, the server-code is a black box that may change without disrupting its clients who, in turn, depend only on its description (interface). Once the service is defined, it may be refined and reused many times. This service-oriented model enables constructing sophisticated Web-applications by developing services based on other services. It is possible to do so, because server-side components of different vendor platforms can be uniformly wrapped and interact as well-defined services. Thus, the service-oriented model solves server-side integration issues. However, the need to unify the presentation tier at the client-side still exists. By following the client/server separation principle, it would be desirable not to have any presentation-code at server-side and have servers only supply Web-services. This way, presentation-code would become loosely coupled with server-code and would become reusable across server applications.

In order to achieve full client-side presentation management, the entire presentation tier must be managed within one-document boundaries. This would eliminate display flickering and the need for session management at server-side. That document can be dynamically updated in the background by using the above-described Web-services infrastructure.

Browser applications are built around one document, known as (X)HTML, containing a structure of presentation tags. This structure of presentation tags is programmatically available through a document object model application programming interface (DOM API). In other words, an (X)HTML document loaded inside a browser, becomes programmable (ready to be manipulated) through the DOM API.

An (X)HTML document can contain embedded or linked scripts to be executed by the browser. Those scripts are usually written in a high-level programming language known as ECMAScript (a language defined by a public and widely accepted standard —ECMA-262). The scripts are loaded and internally compiled by the browser. These scripts are built to use the DOM API by listening to its events and manipulating the (X)HTML presentation structure accordingly.

An application built to exploit these features would be able to made Web-server round-trips only when necessary and would be able to send only pure data over the network connection (as XML files). This way, expensive client/server roundtrips over the network, would be avoided, session state would be maintained at client-side and the presentation would become much more responsive (immediately updated without flickering).

Such a method is feasible given the current Web-programming model, but impossible to achieve in a cost-efficient manner because the underlying browser object model cannot be uniformly extended in a standards-based way. The DOM API is a closed set of objects, defined by a consortium of software vendors known as the W3C. Such a closed set of objects can never suffice; therefore, there are two extension mechanisms available: one is based on native components and the other is based on script objects. The extension mechanism, which is based on native components, forces the developer to rely on one of the traditional programming platforms. This extension mechanism is only applicable by, browser and operating system vendors (because they, can force users to regularly update their software). For independent software vendors and especially for application service providers this mechanism is extremely, inconvenient. In a Web-application, the appropriate extension mechanism to be used is therefore based on script objects.

There are always gaps between the standard DOM API specifications and the browser implementations provided by different vendors. In addition, the browser programmatic behavior is not entirely defined by the standard DOM API. However, the leading vendors supply decent substitutes. Obviously, those substitutes are not interchangeable, so scripts must be adjusted specifically for each vendor implementation of the DOM API.

A complex browser application requires many script objects. Although it is possible to separately package scripts in linked script-files, those script-files must be loaded together during the loading of the (X)HTML document, even if only a portion of them is to be used. This may prolong the start-up time, inflate the network traffic and increase the server load. Moreover, the ECMAScript language, as most other script languages, lacks the advanced language features that characterize full-featured object-oriented languages such as C++, Java, C# and VB.NET. Missing features of the ECMAScript programming language include namespaces, accessibility rules, strong types, type descriptions, type inheritance and polymorphism. Those features are essential for the development of complex software applications.

Therefore, a method for building reusable software components and a system for dynamically loading and linking them together in a browser execution environment is needed. Such a method and a system must be completely based on existing and widely accepted Web-standards in order to be client platform agnostic and to leverage existing features built into those standards, so a standards-compliant alternative to traditional programming platforms may be provided.

As explained above, the desired solution must be built on top of existing and widely accepted Web-standards. In addition, it must not contaminate them—future versions of those standards and even not-yet-invented standards, must not collide with the proposed solution.

Given the above requirements and constraints, the most reasonable possibility is to build a layer of software that would abstract away the differences in current and future browser implementations. This software layer must guarantee uniformity across supported browser implementations, i.e. transparent code porting. This software layer must be uniformly extensible—it must lay down the basic extensibility mechanisms. Somehow, application developers must be convinced to program only against this software layer and achieve that in a consistent and verifiable way. The solution is a new programming language. That programming language must complement the missing features of the ECMAScript programming language: namespaces, accessibility rules, strong types, type descriptions, type inheritance and polymorphism. Software components built with that enhanced programming language, must be loadable and processable by current browsers. That programming language should be built on top of existing and widely accepted Web-standards—the XML set of standards. This way, it would be possible to parse, validate and transform that programming language on any combination of browser and operating system. Latest generation of browsers can load, parse and transform XML content. Moreover, there are many free implementations of standalone XML parsers, XSL transformators and XSD validators, which can be used to build specialized development tools or application server frameworks.

A repository structure definition and a set of resource naming rules are required. Different types of resources must be distinguishable. Different versions of the same resource must be distinguishable. Those rules must work reasonably both in a Win32-OS and in a Unix-OS file-system. Those rules must not require special Web-server setup. In general, deployment should be smooth as file copying can be. A runtime support is required for such a programming language. That runtime must be able to load, compile, link and manage software components built with that programming language. It must provide basic services, uniformly across browser implementations; mainly resource loading, call interception and component instantiation. Loading and compiling processes must be open for change Without touching runtime's code—this way, the system can evolve With new resource loading schemes and new programming language features. New resource loading schemes might be required for new protocols. New programming language features may include generics support, aspects support, etc.

That runtime support should be natively executable by current browsers. It should rely as much as possible on existing and Widely accepted Web-standards—the ECMAScript Language Specification, the DOM Core and the DOM Range/Traversal specifications (or any other decent substitutes). The runtime should support internationalization features.

Finally, a set of system packages need to be built in order to wrap the runtime support, the DOM API and any additional (present or future) native interface. The goal is to make those interfaces appear as they were programmed using the new programming language and to close the gaps between different browser implementations.

DETAILED DESCRIPTION OF THE DRAWINGS

Figure 6:
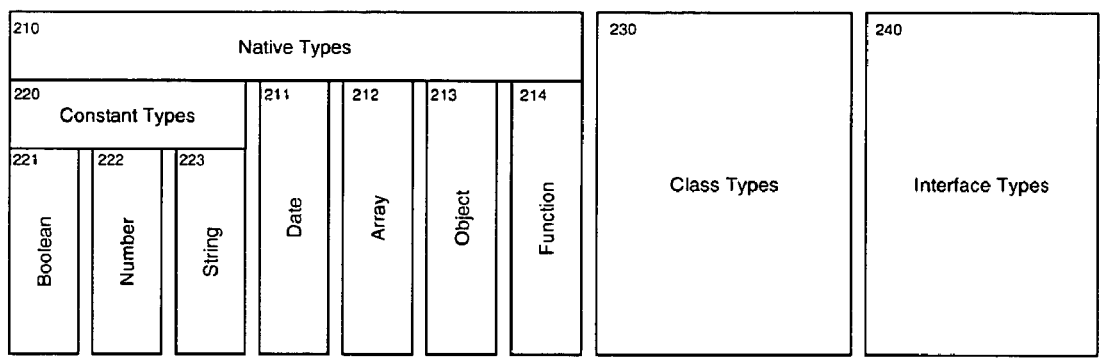
Figure 7:
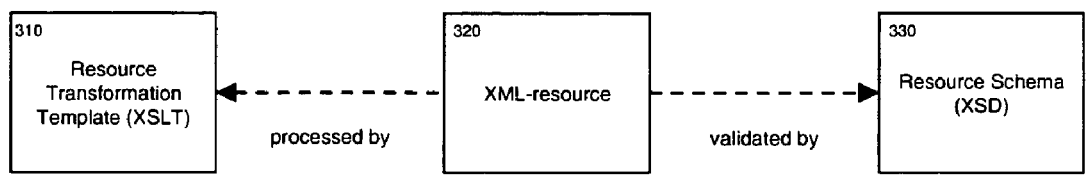
Figure 8:
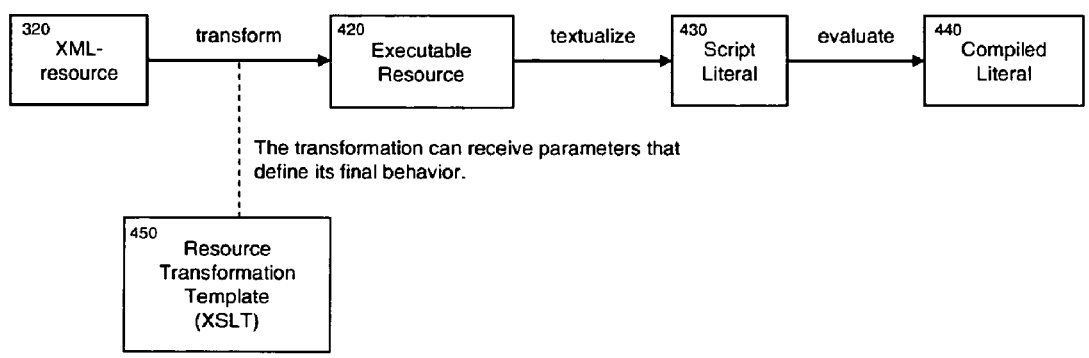
Figure 9:
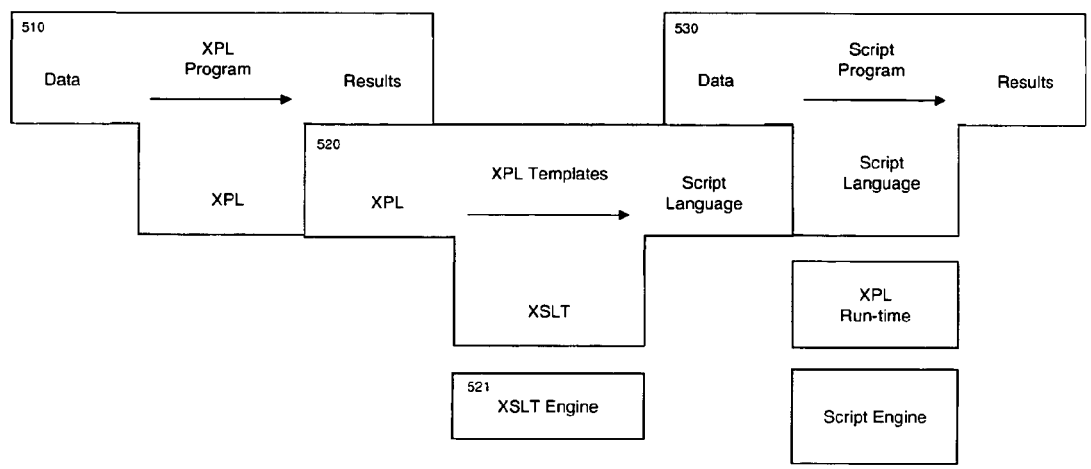

FIG. 6 specifies the type-system of the language according to the preferred embodiment of the present invention;

FIG. 7 is a block diagram that describes the general resource processing procedure as defined by the XML framework;

FIG. 8 is a block diagram of the resource processing procedure as required by this invention;

FIG. 9 is a T-diagram that summarizes the concept of an XML-compliant programming language (XPL), processed and executed in standards-compliant programming environment.

SUMMARY

According to the present invention is suggested a method for processing an XML-based programming language and executing a componentized application written in that XML-based programming language by relying only on a standard-based programming platform for sustaining the execution at run-time. The suggested method include the following steps: initializing said programming platform by loading the environment description and resources for said application, dynamic loading of multiple components descriptions and resources from one or more repositories as required by application's execution path, transforming each component description from said XML-based programming language into multiple literals of ECMAScript programming language by applying dedicated transformation rules, binding and loading each of the component's literals into an ECMAScript engine in order to make said components and said programming platform programmatically available for each other and monitoring the execution of each component in order to detect potential defects, potential performance bottlenecks and the need to load other components.

| Glossary | |
|---|---|
| Adapter | An encapsulation of some specific engine, which provides a service to some system as described by that system's SPI. |
| API | Application Programming Interface; it is the services which a system makes available to its applications through a set of programmatically available functions. |
| Application | A set of interrelated programs, designed to provide useful functionality to a user. Applications are usually built on top of a system. |
| Behavior | The actions and reactions of an object in relation to its environment and stimuli. |
| Bootstrapping | The operation where a given system activates a more complex system. |
| Cache | A more accessible memory location, used to temporarily store documents or object references. |
| Class | A type that implements one or more interfaces. It describes a data structure as a set of fields and the associated behavior as a set of methods. It is used to instantiate statically typed objects. |
| Client | The requestor of services. |
| Cloning | The operation of creating an identical copy of a source object. The created copy is distinguishable from its source only by its identification means. |
| Compilation | The operation of code translation from one high-level language to another, or from a high-level language to an intermediate or to a low-level language. |
| Compile-time | The time of preparing a program for execution. Compilation may occur at runtime - in such cases, the program is loaded dynamically by some program loader and compiled on the fly. |
| Complex Operation | An operation composed of other complex or primitive operations. It may have side effects, which would reflect on its environment. It may return abnormal values by raising an exception. |
| Complex Value | A value composed of other complex or primitive values. |
| Component | An opaque object, activated through a well-defined set of connectors. It is opaque in the sense that its implementation, namely data structure and algorithms, is hidden behind the interface. It is defined by a group of classes. |
| Connector | An object stub, aimed to control the access to an associated object and to monitor its activity - this way, the associated object becomes opaque. It is an instance of an interface previously associated with a class. |
| Constant | A fixed value at runtime. |
| Construction | The operation of bringing an object into its initial valid state. The first operation performed by an object after its instantiation. |
| Debugging | A method of finding defects in a program. |
| Delegate | 1. An object, which encapsulates one or more function references, used to associate one event source to one or more event handlers. 2. The operation of transferring control to other function or object. |
| Description Language | It defines the characteristics of entities and the static relations among them. |
| De-serialization | The complementary operation of serialization. |
| Design-time | The time when a program is not at runtime (e.g. during development, deployment, etc.). This includes "Compile-time" if the compilation does not occur at runtime. |
| Document | A serialized object. The structure of a document is defined by its (main) resource type. In a file-system, documents are stored as files. |
| Encapsulation | The hiding of implementation details, especially the data structure, behind a functional interface, in order to reduce client dependency. |

-continued

| Glossary | |
|---|---|
| Engine | A part of some system, which performs an essential service for the system itself and for its applications. It is the software that encapsulates a facility. |
| Entity | Anything that is programmatically available to a system or application. |
| Environment | The set of objects that have meaning outside of some executing function and that can affect that function's outcome. The environment is often regarded as the global object. |
| Event | An operation signature associated with some object, where the implementation is supplied by a handler. The object can invoke that handler by raising the event. |
| Event Handler | The method to be executed when an associated event is raised. |
| Exception | An object that describes an unusual condition. |
| Exception Handler | A complex operation designed to allow the program to continue its normal execution by recovering or ignoring the exception. |
| Execution | The particular realization of some operation. Being a realization, it consumes a limited resource - time in this case. |
| Facility | The hardware behind some engine. |
| Field | Part of the data structure encapsulated by an object (a.k.a. instance variable). |
| Format or Structure | A specific, pre-established, arrangement or organization of data. |
| Function | An operation implementation labeled with some name. |
| High-level Language | An abstraction of a lower-level language. |
| Imperative Language | It describes the behavior of entities as series of instructions. |
| Inheritance | The concept by which one type inherits the definitions of a more abstract type. |
| Instance | A particular realization of some type or prototype. Being a realization, it consumes a limited resource - space in this case. In this context, an instance is a space allocation in volatile memory. |
| Instruction | The intention of invoking some operation. |
| Interface | A type that defines the expected behavior of an object as a set of operation definitions. It is used to instantiate connectors. |
| Intermediate Language | The representation of some high-level language in a more convenient format. |
| Invocation | The operation that prepares the executional environment of some function and passes control to that function. An invocation has a call source, which is regarded as the "caller", and it has a call target, which is regarded as the "callee". |
| Layer | A group of related functions, which have the same set of dependencies. A layer defines a level of functionality with a well-defined interface to the layer above. In a well-defined layered architecture, functions in one layer seldom call each other but call functions in the immediate lower layer. |
| Library | A collection of utility functions or classes, designed to enrich the functionality provided by a system to its applications. |
| Literal | The notation of some constant. Because programs are not expected to change during execution, the program representation itself is considered a literal. |
| Low-level or Native Language | It is defined and implemented by the underlying system; in this case, defined by ECMA-262 and implemented by some compliant script engine. |
| Meta-data | It is data about data; it is a helpful description, not the content itself. |
| Method | A function associated with some object, aimed to change or access the state of that object. It defines a kind of message (stimuli) that is meaningful for the associated object. Methods can be invoked on the object by other objects or by the object itself. |
| Name | A string which is used to identify an entity. |
| Namespace | A hierarchical context for names; it is used to disambiguate names one of another. |
| Object | In general, and object is a data structure associated with functions that were specially designed for changing or accessing the data structure encapsulated by that object. In class-based languages, an object is an instance of a predefined class. In prototype-based languages, and object is an undefined set of properties (i.e. properties can be added or removed at runtime). |
| Object Proxy | A stateless instance. It is a set of operation stubs, used to wrap a client object. It encodes requests and decodes responses. |
| Object Stub | A stateless instance. It is a set of operation stubs, used to wrap a server object. It decodes requests and encodes responses. |
| Operation | It is intended to change or access data. |
| Operation | A constant that defines the input and output of an operation as: a |

-continued

| Glossary | |
|---|---|
| Definition | predefined set of accepted parameters, their types and ranges; the type and range of the return value; and the enumeration of the expected exception types. |
| Operation Implementation | A program, usually unstructured. |
| Operation Signature | The encoded form of an operation definition. |
| Operation Stub | An operation that sets the environment for an enclosed operation; usually used to monitor that enclosed operation. |
| Overloaded Function | A function that has multiple concrete versions, where each of those versions accepts a different parameter set. The proper version is selected and bound according to the actual parameter set used by some specific invocation. |
| Overriding | The concept of intercepting a function invocation in order to replace or to enrich its behavior. |
| Package | A container for some library, which has some meta-data about the contained library (e.g. version, dependencies, author, etc.). |
| Parameter | A value or reference on which function's outcome depends. |
| Parsing | The operation that produces a representative object tree out of a structured content. |
| Polymorphism | The concept of multi-faceted object. A polymorphic object has the ability to have many interfaces. |
| Postcondition | A fact that must be true just after the execution of some operation. |
| Precondition | A fact that must be true just prior the execution of some operation. |
| Presentation (Tier) | The part of application, which deals with user interface management. |
| Primitive Operation | An atomic operation. It executes independently of its environment and it has no side effects. Primitive operations are usually defined and implemented by the underlying system; in this case, primitive operations are defined by ECMA-262 and implemented by some compliant script engine. |
| Primitive Value | A scalar. It is not referenceable, but it can be boxed into an object in order to achieve referenceability. Primitive values are defined and represented by the underlying system; in this case, primitive values are defined by ECMA-262 and represented by some compliant script engine. |
| Private Function | A method available only to the methods of the same object. |
| Program or Script | A series of instructions, usually structured as functions, which are grouped as classes, which are in turn grouped as libraries. |
| Programming Platform | A system that imposes a programming language atop of its programming model - it is language oriented (i.e. declarative). |
| Property | In a prototype-based language, a property is part of an object; it can be a primitive value or a reference. |
| Prototype | An object used to instantiate similar objects by cloning. ECMAScript is a prototype-based object-oriented language in contrast with class-based object-oriented languages (e.g. Java, C++ and the language described in this patent). In a class-based language, state is carried by instances, methods are carried by classes and inheritance is only of data structure and behavior. In a prototype-based language, state and methods are carried by instances, while data structure, behavior and state are all inherited. Prototype-based languages allow instance's data structure to be altered at runtime; for this reason, they are considered dynamically typed languages. |
| Qualified Name | It identifies an entity that is nested in other entity, no matter how deep is the nesting level. |
| Raise | The operation that invokes an event handler. |
| Reference | An object that encapsulates the location of a function or of other object. |
| Repository | An engine, usually a file system, which provides resource storage in non-volatile memory. |
| Resource | Anything that is available through an URL. |
| Resource Type | An identifier of some resource content structure. It is the same as "Content-Type" as defined by "MIME/Media Types" - RFC2046. |
| Return | The complementary operation of invocation. It includes an environmental clean-up and the passing of control to invocation's caller along with an optional value or reference. |
| Runtime | 1. The occurrences of a program from its beginning of execution till its end.<br>2. The software library that provides the most basic functionality required for program execution. |
| Schema | The definition of a content's structure. For XML-compliant content, the schema language is defined by the XML-Schema Definition (XSD). |
| Serialization | The operation of flattening an object graph, in order to transmit or persistently store it. |
| Server | The provider of services. |

-continued

| Glossary | |
|---|---|
| Service | A set of related operation definitions, usually available through an "API". |
| Singleton | A class that was defined to have only one instance in a given environment. |
| Site | A branch in tree-like structure, used to denote a place in a repository. |
| Site Root | The location of a branch in a tree-like structure. In this context, a site root is encoded as an URL (RFC1738) or a relative URL (RFC1808). |
| SPI | System Programming Interface; it is the set of services accepted by a system from its adapters. |
| String | A finite ordered sequence of zero or more UTF-16 encoded units of text as defined by RFC2781. |
| Stub | A stub is a small program routine that substitutes for a longer program, possibly to be loaded later or that is located remotely. |
| System | A set of programs, designed to provide useful functionality to application programs. It is extensible by implying a specific programming model - it is API oriented (i.e. imperative). |
| Throw | An abnormal return, signaled by an exception. If the caller does not handle the exception, it would also return abnormally and so on. The system provides default exception handlers. |
| Transformation | The set of rules that define how to translate a structured source content to a differently structured target content. |
| Type | A constant that defines constraints on an instance. It may inherit the constraints of a more abstract type. |
| Value | A stateful instance. The meaning of the value is defined by its type. |
| Variable | A named entity, used to describe state. |
| Vocabulary | An inherent part of a schema that defines the set of elements that might be used in some structured content. |

Related Standards

European Computer Manufacturers Association (ECMA):
ECMAScript ($3^{rd}f$ Edition) Language Specification (http://www.ecma-international.org/publications/files/ecma-st/Ecma-262.pdf)
World Wide Web Consortium (W3C) recommendations:
DOM Level 2 Core (http://www.w3.og/TR/DOM-Level-2-Core)
DOM Level 2 Range and Traversal (http://www.w3.og/TR/DOM-Level-2-Traversal-Range)
Extensible Markup Language (http://www.w3.org/TR/REC-xml)
XML Schema (http://www3.org/TR/xmlschema-o)
XSL Transformations (http:/www.w3.org/TR/xslt)
Internet Engineering Task Force—RFC<id> (http://www.ietf.org/rfc/rfc<id>.txt)

Other Referenced Standards

World Wide Web Consortium (W3C) recommendations:
DOM Level 2 Events (http://www.w3.og/TR/DOM-Level-2-Events)
DOM Level 2 Style (http://www.w3.og/TR/DOM-Level-2-Style)
DOM Level 2 HTML (http://www.w3.og/TR/DOM-Level-2-HTML)
Hyper-Text Markup Language (http://www.w3.og/TR/html)
Extensible Hyper-Text Markup Language (http://www.w3.og/TR/xhtml1)
Scalable Vector Graphics (http://www.w3.org/TR/SVG)
Simple Object Access Protocol (http://www.w3.og/TR/soap)
Web Services Description Language ((http://www.w3.og/TR/wsdl)

Description

The present invention is designed to provide component-oriented language programming constructs in order to enhance the Web-programming platform. This invention allows programmers to design and implement the client-side of a Web-application that fully benefits from browser's presentation capabilities, by providing programmers a general-purpose, class-based, interface-oriented language and a supporting runtime library. The programming language provided by the invention has an XML compliant syntax designed to be readable and processable by using only standard software components. The provided programming language is an intermediate language type for which any number of compilers can be written. The supporting runtime library provided by the invention is designed to be executable on a standards-compliant programming platform, such as provided by common browser types.

According to the preferred embodiment, the present invention is suited for implementation as the client-programming platform of a Web-application, specifically to run in a browser. Other embodiments are possible at client-side, such as running in an e-mail client or in any other desktop application. Another embodiment is possible at server-side, such as running in a Web-server container. The present invention does not depend on the availability of any kind of presentation engine, making it valuable for server-side programming also. The present invention may be adapted to work with non-standard presentation engines as well.

Figure 1:
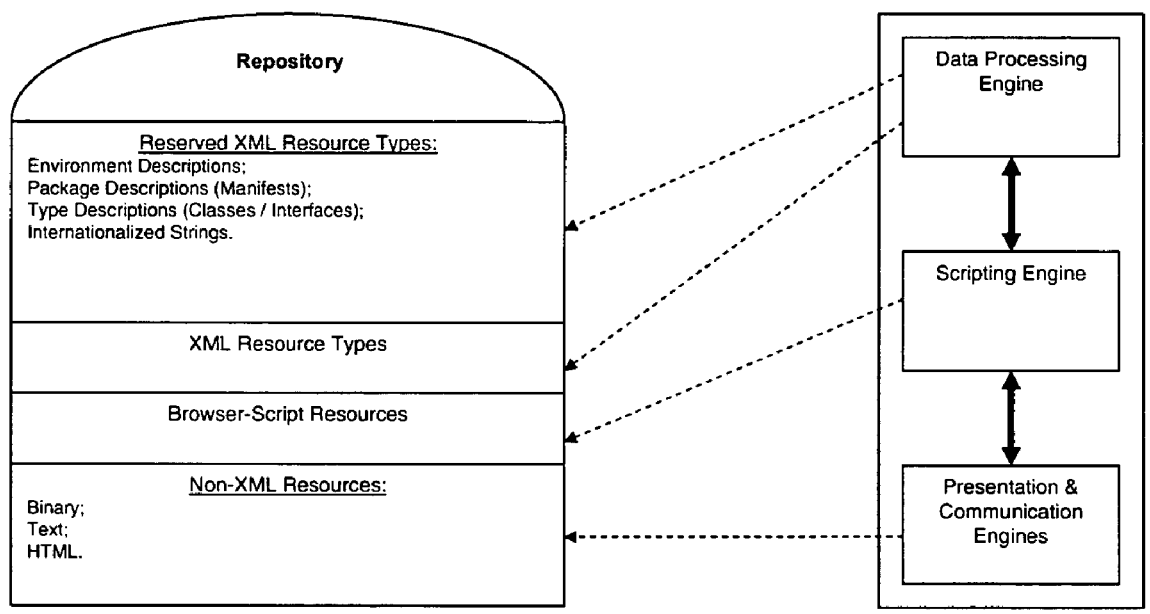
FIG. 1 is a block diagram illustrating the repository structure and resource types according to the present invention.

The operational steps of the present invention according to a non-browser embodiment, differs only in its interaction with the available presentation engine, which may have different characteristics than browser's (X)HTML-based engine, although every interactive presentation engine is event-driven. In a server-side environment there is no presentation engine, so a server-side embodiment of the present invention would not interact with a presentation engine at all—the start and shutdown events would be generated by the Web-server container and all its input and output operations would be accomplished through communication channels. Following is a description of the system. The concept definitions are in the accompanying glossary A block diagram of the repository structure and contents is illustrated in FIG. 1. The repository forms a namespace for resources—it forms a tree of resources, as folders are nested one into another. Folders in the repository are identifiable by names while resources are identifiable by their typed-names. The repository's root is an aggregation of Package trees where each Package tree is a different folder under repositonr's root. The Runtime libraries, if any, are stored under a specially named folder so they could not be identified as a Package. There is one root Package reserved for the system itself (named "system").

All resources stored in the repository are loaded by the communication engine, but are processed by the different components of the browser: browser-script resources are handled by the scripting engine; XML resources are handled by the data processing engine; textual, HTML resources and binary resources, such as images, video and audio are handled by the presentation engine, in some cases with the aid of external programs.

The present invention relies on reserved XML resource types. The reserved XML-resource types are special XML formats ("vocabularies" in XML jargon) required by this patent. Each one of these vocabularies is defined by an XML-Schema (XSD) and is uniquely identifiable by a URI (Uniform Resource Identifier as described by RFC2396).

Following is a Specification of the Reserved Resource Types.

The Environment Description contains the title, the debug flag, the start-up Class name, the start-up parameters, relative URLs to static libraries (to the Runtime libraries), relative URL to the hosting repository site root and an optional (X)HTML page. Environment resources are identifiable by a typed-versioned-name.

The Package Description contains the debug flag, the version information (specification and implementation Aversions) and the Package dependency rules. If the Package is a system Package then its description may contain platform compatibility rules. In addition, Package Descriptions may include additional meta-data, such as author's name, code base URL, etc. Package dependency rules contain the qualified name and version of the dependant Package. Platform compatibility rules contain the version information string (signature) of the compatible platform. Package Descriptions are special resources that have a fixed name. A Package Description is versionable, but multiple versions cannot co-exist in the same repository—in a given repository, old Packages are replaced by new Packages. In contrast, multiple versions of the same Entity Description can co-exist in the same repository. Entity Descriptions contained by a Package folder are allowed to change over time. The Package is expected to change its version if a new version of one of its contained Entity Descriptions was created—this means that Packages are expected to be backwards compatible. Besides Entity Descriptions, a Package folder may contain Localized Strings.

The Interface Description is a special kind of Entity Description, which contains the attributes, the base Interface name, constant descriptions and Operation descriptions. Constant descriptions contain the name, the primitive Type name and the value. Operation (event or method) descriptions contain the name, the return Type name, the range, the parameter descriptions and the Exception descriptions. Parameter descriptions contain the name, the Type name and the range. Exception descriptions contain the Type name of the Exception. Interface Descriptions are identifiable by a typed-versioned-name.

The Class Description is a special kind of Entity Description, which contains the attributes, the base Class description, the supported Interface descriptions, the field descriptions, the Class reference descriptions, the private function descriptions and the method descriptions. The base Class description contains the inherited Interface descriptions. Inherited Interface descriptions contain the Connector alias, the Interface name and the exposing flag. Supported Interface descriptions contain the Connector alias and the Interface name. Field descriptions contain the name, the Type name and the default value (applicable for primitive Types only). Class reference descriptions contain the default Connector alias and the referenced Class name. Private function descriptions contain the name, the return Type name, the parameter descriptions, the local variable definitions and the body description. There are four special private functions, which have no return Tape and no parameters—those functions are the constructor, the cloner, the reader and the writer. Method descriptions contain the name, the return Type name, the implemented Interface name, parameter descriptions, local variable definitions and body definitions. Parameter descriptions contain the name and the Type name. Local variable descriptions contain the name, the Type name and the default value (applicable for primitive types only). Body descriptions contain the method implementation in some imperative language—if the method implementation belongs to a system Class then the imperative language is ECMAScript compatible otherwise, it is an XML-compliant imperative language. Class Descriptions are identifiable by a typed-versioned-name.

The Localized Strings is a resource that contains name-value pairs of strings in a specific language/dialect. Localized Strings resources are identified by a language/dialect mnemonic (RFC1766).

The non-reserved XML resource types can have any XML-compliant format, standard or user-defined.

The non-XML resource types can have any text or binary format. In a file-system, resources are stored in files and the resource type is determined by its file extension. Web-servers are configured (by default) to recognize a widely used set of file extensions. For each served file, the Web-server appends appropriate MIME-type information in a special HTFP header. This is used by Web-browsers to determine the resource type.

In order to make a distinction between the reserved resource types, a multiple file extension scheme is used. In order to make a distinction between different versions of some resource, the file-name is appended a hyphen followed by the decimal digits of the version. For example, "FileName-1.xcls.xml" contains the first version of a Class Description. This scheme prevents the reconfiguration of Web-servers while providing the means to distinguish between the reserved resource types.

As previously mentioned, the Runtime does not require a presentation engine—it only needs a scripting engine, a data processing engine and communications engine. In a minimal, standards-compliant, programming environment the scripting engine must support the ECMA-262 $3^{rd}$ Edition Specification, the data processing engine must support the DOM Level 2 Core Specification, the DOM Level 2 Traversal and Range Specification and the XSL Transformations and the communications engine must support the Hypertext Transfer Protocol (HTTP as defined by RFC1945).

Figure 2:
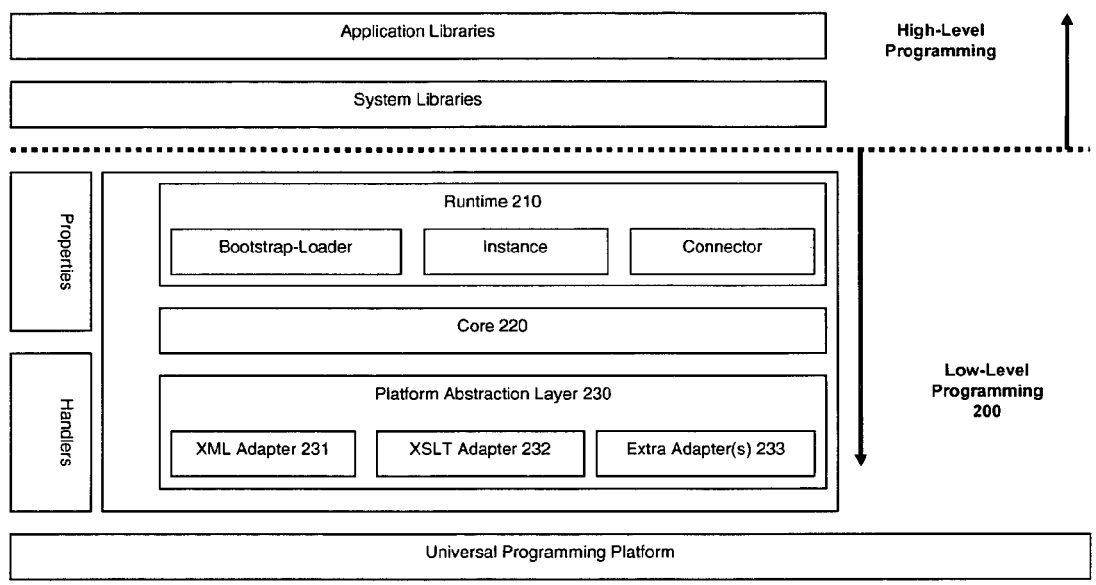
FIG. 2 illustrates the layered architecture of the runtime libraries according to the present invention.

FIG. 2 illustrates the layered architecture of the Runtime libraries. The low-level programming 200 includes the libraries of the Runtime 210, the Core 220, the Properties 240, the Handlers 250, the Platform Abstraction Layer 230 and its Adapters as embedded and/or linked script resources (an initialization function is always embedded into the Environment Description, while the rest might be URL-linked). These libraries are in a format (programming language), which is natively understood by the scripting engine—ECMAScript prototypes are used to define and initialize the corresponding objects during Environment's initialization. The Runtime libraries include the Bootstrap-Loader 211, the Instance 212 and the Connector 213 prototypes.

Each kind of Adapter supports a predefined SPI (e.g. XML functionality, XSLT functionality, etc.)—that SPI being defined by the Platform Abstraction Layer. Each Adapter is associated with one platform signature (version information string). There might be multiple Adapters of some kind where each one of them is associated with a different platform. Each Adapter contains the implementation (computer instructions) of its supported SPI for its associated platform.

The Platform Abstraction Layer is a platform independent set of SPI definitions. By programming to that SPI set, platform portability can be easily achieved. During porting, upper software-layers can remain untouched, while a new set of Adapters can be written to support the new platform.

The Properties are a set of initial named values, used to configure the Core and the Runtime (e.g. caching parameters, default application Type-Loader name, fallback user-language mnemonic, etc).

The Handlers define Environment's start and shutdown behaviors. These Handlers are hooked during Environment's initialization.

The Core turns the Platform Abstraction Layer programmatically available to the upper software-layers. During initialization, it detects the running platform and hooks the right Adapters, by creating an accessor-object for each kind of Adapter SPI defined by the Platform Abstraction Layer. During initialization, it may hook additional mechanisms to act between the Adapters and potential clients (e.g. DOM object caching, compiled XSL template caching, etc). During runtime, it supplies the previously created set of accessor-objects, so the upper software-layers, namely the Runtime, could access the underlying platform services in a platform-independent manner.

Figure 3:
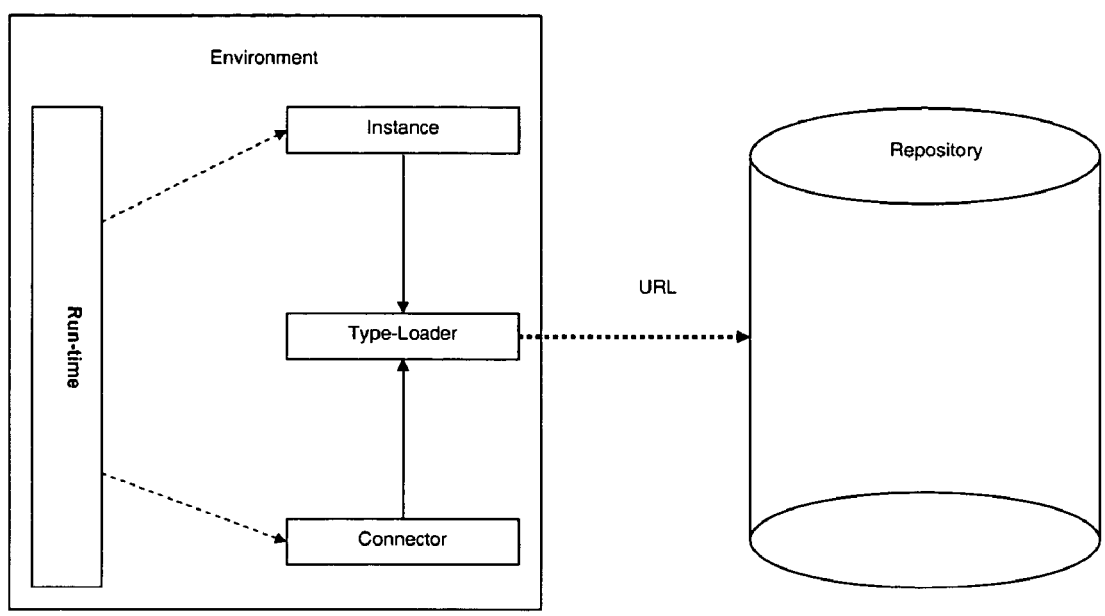
FIG. 3 is a block diagram illustrating the structure of the runtime internals according to the present invention.

The functions of the Runtime are resource loading, Instance creation management and Instance connectivity management (call interception)—those functions are built into the Bootstrap-Loader, Instance and Connector prototypes, respectively. Following is a detailed description of Runtime's internals as illustrated in FIG. 3. The Environment initializes by creating a Runtime instance. The Runtime loads Classes and Interfaces by using one or more Type-Loaders. The Runtime defines an intrinsic Type-loader, namely the Bootstrap-Loader, but the user can define his own Type-Loaders. Besides the Bootstrap-Loader, the Runtime defines two other intrinsic objects, the Instance and the Connector. The Runtime creates explicit Instances and Connectors by using Classes and Interfaces, respectively. The Runtime provides and monitors access to Instances through Connectors. The Runtime supports the most basic Operations of a componentized application by providing a uniformly extensible set of interrelated Operations grouped as objects. Those objects, except the intrinsic ones, are defined by Classes and Interfaces—the details of those objects appear below.

The Entity-Loader facilitates resource and Package Description loading. Entity-Loaders are initialized to have a parent Entity-Loader and an associated set of repositories. The Entity-Loaders supply the means to load resources. In addition, they supply the means to define Packages and to retrieve defined Packages. Defined Packages cannot be redefined—the Entity-Loaders enforce that. Entity-Loaders delegate resource-loading requests to their parent Entity-Loader. Unresolved resource-loading requests are forwarded to Entity-Loader's extender through the event mechanism. Entity-Loaders store the defined Packages into an internal Package pool. Entity-Loaders try to resolve Package-retrieving requests from their own Package pool. If that fails, then the request is delegated to the parent Entity-Loader. If that fails also, then the request is forwarded through the event mechanism to Entity-Loader's extender, which might throw an Exception in case of failure.

The Bootstrap-Loader is the root of all Entity-Loaders and is associated only with the hosting repository (i.e. the repository from where the Environment Description was loaded). The Bootstrap-Loader is the only non-delegating Entity-Loader. System Packages are always defined by the Bootstrap-Loader, since those Packages are found in the hosting repository—the outcome is that system Packages are shared by all Entity-Loaders, while non-system Packages might be defined in parallel by multiple Entity-Loaders. Generally, Entity-Loaders share Packages on the ancestor axis, but conceal Packages from their peers.

Resource-loading requests are resolved by mapping their qualified name to an URL relative to the associated repository site root. A typical request is, for instance, "give me the "com.cnn.weather/1" resource. Mapping it to an URL includes replacing the slash with a hyphen, replacing each dot with a slash, pre-pending the repository URL and appending the file extension according to the resource type. If it is a request for a Class Description, then the outcome may look like this: "../../../../com/cnn/weather-1.xcls.xml".

The Entity-Loader is an abstract Type; it therefore must be extended. This abstraction allows specialized kinds of Entity-Loaders (e.g. Type-Loaders, Aspect-Loaders, etc.) to be implemented on top of this architecture. Entity-Loader's extensions can implement any kind of loading policy such as user-defined communication protocols and any kind of Entity Description processing. This feature enables users to extend the system by defining their own communication protocols and their own high-level languages.

The Type-Loader extends the Entity-Loader in order to facilitate Type loading. The Type-Loaders supply the means to define Types and singletons and to retrieve defined Types and singletons. Type definition requires a Package to be associated with the defined Type. Defined Types and singletons cannot be redefined—Type-Loaders enforce that.

Type-Loaders store the defined Types into an internal Type pool. Type-Loaders try to resolve Type-retrieving requests from their own Type pool. If that fails, then the request is delegated to the parent Type-Loader. If that fails also, then the request is forwarded through the event mechanism to Type-Loader's extender, which might throw an Exception in case of failure.

Type-Loaders store the defined singletons into an internal singleton pool. Type-Loaders try to resolve singleton-retrieving requests from their own singleton pool. If that fails, then the request is delegated to the parent Type-Loader. If that fails also, then the requested singleton was not instantiated yet and a quiet failure would occur. System Types are always defined by the Bootstrap-Loader, since those Types are found in the hosting repository—the outcome is that system Types are shared by all Type-Loaders, while non-system Types might be defined in parallel by multiple Type-Loaders. Generally, Type-Loaders share Types and singletons on the ancestor axis, but conceal Types and singletons from their peers. The association between a Type and its defining Type-Loader uniquely identifies that Type at runtime. This allows multiple pseudo-applications, which are loaded from different repositories, to run in the same Environment with minimum interference.

The Type-Loader is an abstract Type—it must be extended. One extension is supplied by the default application Type-Loader. Users are free to define their own Entity-Loader or Type-Loader extensions and to replace the default application Type-Loader by changing the appropriate system property. Type-Loader's extension finally defines Type's loading and processing policies.

The Connector, whose concept is similar to the "virtual table" concept, used by languages such as C++ to provide dynamic function binding, encapsulates a predefined set of function references (pointers)—specifically, a Connector carries a set of constants and a set of operation-stubs. A Connector is defined by a specific Interface. A Connector is never instantiated directly, but only through a Class instantiation. A Connector is associated with exactly one Instance and is aimed to intercept Operation invocations. All Connectors form an interception layer—a single point that can be used to apply any kind of pre/post-processing to any Operation invocation (e.g. parameter checking, Exception checking, logging, performance monitoring, etc.). Connectors have a few built-in Operations: Type inquiring, method invocation, event Delegate setting, event raising and Interface casting (i.e., switching between Connectors of the associated Instance).

An Instance is a memory allocation—it consumes a limited resource. An Instance carries state (variables) and related Operation implementations. An Instance is defined by a specific Class and created by using that Class. An Instance is accessible only through its associated Connectors. An Instance is uniquely identifiable at runtime and is associated with one context Type-Loader—the Type-Loader that defines the Class of the Instance. The Runtime has full control over the Instances, but user's applications (programs) can access Instances only through Connectors as dictated by the programming model. Type instantiation requests are by default handled by the context Type-Loader. Instances have a few built-in Operations: equivalence testing, cloning and serializing/de-serializing.

The Package provides access to a Package Description by supplying the means to query information contained in that description, such as Package's name, version and debug flag. In addition, the Entity allows querying for information assigned during runtime, such as the defining Entity-Loader. A Package is continuously associated with its defining Entity-Loader—the same Package being defined by different Entity-Loaders results in different Packages.

Packages supply the means to check their platform compatibility and Package dependency rules. The platform compatibility rules are tested against the current platform type and version until a compatible rule is found. The Package dependency rules are tested by retrieving each referenced Package and checking if its version is great or equal to the version that appears in the respective rule. If any of those tests fail, an appropriate Exception is thrown; otherwise, the Package would enter in the checked state.

In addition, Packages supply the means to retrieve Localized Strings according to the current user-language. If the requested string is not found using the current user-language then the string is searched using the fallback user-language. If that fails also, then an appropriate Exception is thrown.

The Entity provides access to an Entity Description by supplying the means to query information contained in that description, such as Entity's name and full-access to the description data. In addition, the Entity allows querying for information assigned during runtime, such as the defining Entity-Loader and the associated Package. An Entity is continuously associated with one Package, which in turn is continuously associated with its defining Entity-Loader—the same Entity being defined by different Entity-Loaders results in different Entities. The Entity abstraction allows specialized kinds of Entities (e.g. Types, Aspects, etc.) to be implemented on top of this architecture.

The Type extends the Entity in order to provide access to a Type Description by supplying the means to query information contained in that description, such as kind (i.e. Interface or Class), attributes (i.e. "private", "abstract", etc.) and base Type. The Type also supplies the means to load other Types. There are two kinds of Types: interface-types and class-types.

The Interface extends the Type in order to provide access to an Interface Description by supplying the means to query information contained in that description, such as set of constants and set of Operations (i.e. methods and/or events). The Class extends the Type in order to provide access to a Class Description by supplying the means to query information contained in that description, such as set of supported Interfaces. The Class also provides the means to create Instances according to the encapsulated description.

The Operation provides access to an operation description by supplying the means to query information contained in that description, such as kind (i.e. method or event), name, defining Interface, set of parameter Types, return Type and set of Exceptions. The Operation also supplies the means to invoke method's implementation or event's handler on a target Connector and to compare to other Operations. The Delegate is used to hook event handlers to event sources by supplying the means to define and query the method reference and its target Connector, to aggregate and disaggregate other Delegates and to query about the aggregated Delegates. A Delegate encapsulates one method reference, its target Connector and other aggregated Delegates.

A Delegate can be invoked—this Operation Bill invoke the encapsulated method on the target Connector and also will invoke each one of its aggregated Delegates. The last method's result is returned as the result of the Delegate invocation itself. In case an Exception is thrown by some method invocation, the Delegate stops the execution and propagates that Exception to its invoker. The Connector's built-in event raising mechanism expects a Delegate to work with.

The Exception encapsulates information about an exceptional condition. Such an exceptional condition is a result of some failure that happened during the invocation of some Operation. An Exception can be seen as another kind of Operation return—an abnormal return. An Exception might have a parent Exception—the cause. Usually, an Exception triggers another Exception and so on, creating an Exception chain. Exceptions supply the means to query and set information about themselves such as cause, message, source and extra data. The Exception is an abstract Type—it is always extended by a user-defined Exception Type.

Exceptions might be thrown by user-code, or by system-code. User-code can define Exception handlers in order to override the default handling supported by the Runtime.

The description above refers to the Runtime from the perspective of a running application. In addition, the description above has no intention to constrain the actual implementation of the Runtime. Following is a description of the high-level programming layers.

The system libraries form a software layer that wraps the Runtime and any other low-level services (such as the DOM API). The above described Runtime's Entities are made available through Interfaces of the system Package. This way, underlying platform's complexities are hidden and exposed in a uniform and simplified fashion. Application developers never access platform's services in a direct manner, but only through the Interfaces exposed by those system libraries, which appear to be like any other application libraries from the perspective of a running application. Since system libraries directly access platform services, dependence on a specific platform or platforms might occur. System libraries developers have to test their libraries against all platforms they intend to support and include platform dependency rules in the Package Description. System libraries, especially the system Package, require special Runtime support.

The application libraries form the topmost software layer and contain only platform independent Packages. Application Packages cannot define platform dependence—application Packages need to be transparently portable. However, an application Package might depend on some system Package that is dependent on a specific platform—indirect platform dependencies might occur. When that system Package is made available for some new platform, then any dependent application Packages also become instantly supported.

Figure 4:
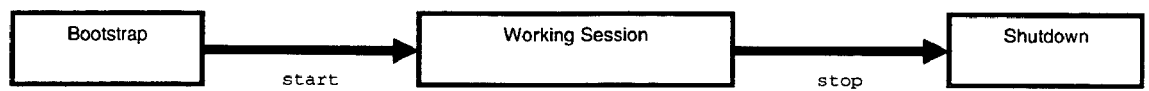
FIG. 4 illustrates the environment's life cycle according to the present invention.

Following is a description of Environment's life cycle according to the preferred embodiment as illustrated in FIG. 4.

A typical Environment bootstrap sequence includes the following steps: first the user points his browser to an Environment Description (by directly typing the URL, by clicking on a hyper-link, or by any other means). Then the browser loads the Environment Description, parses it and applies an Environment transformation template. The result of this transformation is an (X)HTML document containing: a set of static-links to the Runtime libraries, a set of Environment parameters and a start-up script. Next, the browser displays the (X)HTML document and then loads and compiles the set of Environment parameters and the start-up script, which is hooked to the "mindow.onload" event. Once the browser loads and compiles the Runtime libraries and fires the "window.onload" event, the start-up script begins execution. The start-up script uses the Environment parameters to initialize the Runtime libraries, which in turn create and initialize a Core and a Bootstrap-Loader. The Core initializes by detecting the running browser vendor/version and hooking to the right Adapters. In its running state, the Core provides a uniform software layer that abstracts the differences between different vendor browser implementations and provides intermediary services such as object caching. The Bootstrap-Loader initializes by loading the primordial Types from the hosting repository, namely from the repository that contains the Environment Description. In its running state, the Bootstrap-Loader provides resource-loading and Type-loading services.

The Runtime continues the initialization process by asking the Bootstrap-Loader to load and instantiate the default application Type-Loader and then by asking the instantiated application Type-Loader to load and instantiate the start-up Class as defined by the Environment Description. Then the Runtime continue the initialization process by asking the start-up Instance to initialize itself—this is the first event in application's life cycle. At this stage, the Environment bootstrap sequence is considered completed from Runtime's point of view. The start-up Instance may continue to create any number of Instances as dictated by application's needs. Finally, the start-up Instance enters its running state and the control is returned to the browser.

Following is a description of a typical Environment working session. The browser fires different kinds of events in response to timers, background loading and user actions such as keyboard/mouse activity, browser window resizing/closing, etc. The application handles an event by creating new Instances, by manipulating any referenced Instances or by hooking handlers for other events. By manipulating Instances, the application may load any resources from any repositories and may open communication channels to any available services. In addition, by manipulating Instances, the application can alter the display by dynamically changing the structure of the displayed (X)HTML document. Finally, the event handler terminates and the control returns to the browser, which may raise another event and so on.

Following is a description of a typical Environment shutdown sequence: first, the user points his browser to other Web-resource (by directly typing its URL, by clicking on a hyper-link, or by any other means) or by simply closing the browser window. The browser then fires a "window.onunload" event that activates the shutdown sequence. The shutdown sequence invokes the dispose method on the start-up Instance, which may do whatever steps are necessary to end the running application—this is the last event in application's life cycle. Then, the shutdown sequence invokes any registered shutdown handlers. Finally, the control returns to the browser and the Environment shutdown sequence is considered completed from Runtime's point of view.

The high-level software layers provide a higher-level programming language, which complements the missing features of ECMAScript. Following is a description of the higher-level programming language features.

The high-level programming language is both statically and strongly typed. Following is a description of the Type system, as illustrated in FIG. 6.

The native Types 210 are supplied by the scripting engine as defined by the ECMA-262 specification. The primitive Types 220 define primitive values. The class-types 230 and the interface-types 240 are supplied by the Runtime. Native Types are referenced by simple names, while class-types 230 and interface-types 240 are referenced by qualified and versioned names (e.g. "com.cnn.weather/1").

Runtime's supplied Types, the class-types and the interface-types, allow for a single-inheritance type, leading to a single root-class and a single root-interface—the root-class wraps the intrinsic Instance and the root-interface wraps the intrinsic Connector.

The language allows the definition of derived Types—all Types derive by default from the root-types.

The language allows the definition of abstract Types—those must be derived in order to be used. The Runtime does not allow instantiation of abstract Types.

The language allows the definition of finalized Types—those cannot be further derived. The Runtime does not allow instantiation of Types that have a finalized base Type.

The language allows the definition of private Types—those are available only within their own Package. The Runtime does not allow instantiation of a private Type from the outside of its Package. In addition, the Runtime does not allow method invocations on a Connector, which is defined by a private Interface, from outside of the Package that contains that private Interface.

The language allows the versioning of Types. Types are versioned entities, but there is no implied relation between different versions; a different version makes a different Type. A Type can retain its version as long as it does not break its clients. Since different versions of the same Type are actually different Types, multiple versions can exist side by side, so backwards compatibility can be maintained.

The language allows the grouping of Type definitions in Packages in order to provide namespace separation (e.g., "wether/1" belongs to the "com.cnn" namespace). Packages are versionable, but multiple versions cannot coexist in the same repository—Packages are expected to remain backwards compatible. A Package version is expected to be increased in case that a new Type or a new version of an existent Type has been added; Type removal is strongly discouraged, because the Package is then no longer backwards compatible.

The language allows the definition of Classes, which are a special kind of Types. Classes allow the definition of Interface implementations, private functions, fields and Class references. Classes inherit, directly or indirectly, from the root-class—the root-class defines basic Instance capabilities, which relate to the equivalence-test, cloning and serialization/de-serialization support. Public Classes are expected to continue supporting the same set of Interfaces; otherwise, dependent clients would stop working.

Classes may define static references to other Classes. Class references are just a convenience feature—they allow static definition of Class references and a simplified mechanism for Class instantiation. In case that the exact Class name is unknown at design-time, the context Type-Loader can be used to load the desired Class and instantiate it.

Each Class has one default Interface, which has the same versioned-name as the Class itself. The default Interface is always inherited by derived Classes. The default Interface defines the default Connector provided when a Class is instantiated using a static Class reference.

In the scope of the invention, Classes may be used to create Instances that are referenceable only through supported Connectors as defined by Class' supported Interfaces.

The language allows the definition of singleton Classes—those Classes may have at most one Instance.

The Runtime supports non-deterministic memory management; the underlying scripting engine handles garbage collection. However, some Instances need to be manually disposed of, such as the startup Instance and Instances that wrap DOM-based objects—those Instances must support a special Interface that allows explicit disposal.

The language allows the definition of Interfaces, which are special kind of Types. Interfaces allow the definition of constants and Operations. Interfaces inherit, directly or indirectly, from the root-interface—the root-interface defines basic Connector capabilities, which relate to Type inquiring, method invocation, event Delegate setting, event raising and Interface casting. Public Interfaces are expected to remain constant; otherwise, dependent clients would stop working. In the scope of the invention, Interfaces are never used to directly create Connectors—Connectors are created only by the Runtime during Instance creation. The Connectors provide the means for user-code to reference and access Instances. A referenced Connector is associated with only one Instance.

According to the preferred embodiment, the reusability of software components is in a black box style. A black box hides internal details—programmers can write code that depends only on the Interfaces supported by the Class that defines the software component. This is the opposite of white box, where the internal details of the Class are exposed. Code written to use a black box component does not become dependent on its internals. Therefore, maintainers of the black box are free to change the Class (the implementation) as long as it continues to support the published Interfaces. However, in an event-driven system, such as the browser programming environment, this may not be fully achievable because event handlers may reenter event source in unexpected ways, thus creating behavioral dependencies, which cannot be expressed by language semantics. The preferred embodiment allows reentrancy but only in a controlled manner by having the programmer explicitly mark its Classes as reentrant in order to allow reentrancy. The Runtime detects the reentrancy condition and throws a reentrancy Exception.

A derived-class must explicitly expose the Interfaces inherited from the base-class, otherwise those would be available only to the deriving-class itself. An outside client of an Instance of the derived-class cannot distinguish between the Interfaces supported by the derived-class and the Interfaces supported by the base-class, since their Connectors are all associated with the same Instance.

The language allows the definition of algorithms using an imperative language. The imperative language is always embedded in the above described type definition language.

In the simplest case, the ECMAScript language is used as the imperative language. Since the Runtime itself uses ECMAScript for its internal processes, incorrect usage of it by the high-level software layers may destabilize the system. Hence, usage of ECMAScript is appropriate only for system libraries. Application libraries must use only a subset of ECMAScript capabilities. According to the preferred embodiment, an XML-compliant language defines the imperative language to be used by application libraries. During Class loading, a special XSL template is applied in order to produce the appropriate ECMAScript syntax, which is natively understood by the scripting engine.

The Runtime exclusively provides Type instantiation services to applications. There are two cases of Type instantiation: Class instantiation and Interface instantiation. Following is the description of the Type instantiation processes.

A Class instantiates by instantiating its base Class and so on, down to the root-class. Each Class in the inheritance chain, instantiates by instantiating its supported Interface set. This process is managed by Runtime's intrinsic Instance object, which allocates the initial storage area and provides some basic functionality and variables, such as the Instance identifier, reentrancy flag and context Type-Loader reference. Each Class is allocated a table in the Instance storage area, where it can create references to its supported Connectors, fields, private functions and method implementations. Besides the Instance storage area, a Class is also allocated a scoped storage area, where it holds aliases of Class references—a Class reference is an ECMAScript prototype used to instantiate the referenced Class.

If any Classes in the inheritance chain are marked as "singleton", then the only Instance is the Instance for that inheritance chain top Class. This is performed and managed by the context Type-Loader, which holds the name-indexed list of already instantiated singletons. Further instantiation requests are resulted in the same Instance. However, multiple singleton Instances might be created by different (peer) Type-Loaders.

At the end of the inheritance chain process, caller's context must be associated with each one of the private functions and method implementations. Therefore, when one of the Instance method implementations or private functions creates a request, the called function is able to receive context information. This way further instantiation requests would be resolved by default in the same context as caller's context. It is possible to bypass the context Type-Loader by using other Type-Loaders. Finally, at the end of the Class instantiation process, a Connector reference on the created Instance is returned. The Type of the returned Connector reference is always the root-interface (because all Connectors support it).

An Interface instantiates by instantiating its base Interface and so on, down to the root-interface. Each Interface in the inheritance chain, instantiates by initializing its constant fields and by creating Operation stubs. This process is managed by Runtime's intrinsic Connector object, which hooks the Connector to its Instance and provides some basic functionality such as Type inquiring, method invocation, event Delegate setting, event raising and Interface casting.

An Operation stub contains predefined code that calls the pre-invocation handlers, performs the actual method call and, finally, calls the post-invocation handlers. The built-in pre-invocation handler, checks parameter Types/ranges when running in debug mode. The built-in post-invocation handler, checks Type/range of returned value or the Exception Type when running in debug mode.

Finally, at the end of the Interface instantiation process, the control is returned to Runtime's intrinsic Instance object, which may continue instantiating other Interfaces.

The Run-time provides a common behavior for Class and Interface instantiation processes. The first step of a Type instantiation is the loading of its Type description. By default, the context Type-Loader accomplishes this task, although any other Type-Loader can be used. The Type description contains meta-data about the Type and code that defines Type's behavior. If it is the first time that a Type is loaded from its Package, then the Package description is loaded and dependency/compatibility rules are enforced.

If the first Type in the inheritance chain is marked as "private" and the instantiation request source is from a Type that does not belong to the same Package, an accessibility Exception is thrown, as dictated by language semantics. If the first Type in the inheritance chain is marked as "abstract", an abstract-instance Exception is raised, as dictated by language semantics. During inheritance chain processing, a circularity condition might be detected; in this case, a circularity Exception is thrown, otherwise an infinite recursion would occur. During inheritance chain processing, a Type marked as "final" might be encountered; in this case, a finalization Exception is thrown as dictated by language semantics.

The Runtime provides exclusive assistance during Operation invocation. Following is the description of the Operation invocation processes. There are three types of Operation invocation: private function invocation, method invocation and event raising. The invocation of private functions is supported directly by the underlying scripting engine. Parameter Type and range, return value Type and range and Exception Type checks are not effectuated since those invocations do not pass through a Connector.

The invocation of a method is initiated by calling that method stub on some Connector. The method stub maps the method name to an index into the method-binding table of the Instance associated with that Connector. The method stub redirects the request to the invocation managing function of the Connector.

The invocation managing function attempts to retrieve the method implementation reference from the method-binding table, and tries to invoke the method on the Instance. If that succeeded, then the returned value is returned to the method stub, which further propagates it to the method caller. In case of a failure, the thrown Exception is checked, re-thrown to the method stub, which further propagates it to the method caller. One optimization possibility allows direct method invocations inside the Instance, so a method invocation originating from the same Instance can be treated like a private function invocation.

The raising of an event is initiated by calling that event stub on some Connector. Since events are not bound to the Instance, there is no binding table, and the event stub simply redirects the request to the raising managing function of the Connector. The raising managing function checks that the Instance allows event raising to occur, namely reentrancy condition check, and that the event is associated with a Delegate. If those conditions are not met, an appropriate Exception would be thrown. The raising managing function attempts to invoke the associated Delegate. If it succeeds, then the returned value is returned through the event stub to the event caller. In case of a failure, the thrown Exception is checked, re-thrown to the method stub, which further propagates it to the method caller.

Following is a description of the common behavior of method invocation and event raising. Both management functions activate the pre- and the post-invocation handlers only when running in debug mode. In order to check whether the debug mode is activated, the Instance is queried. Upon receiving the query, the Instance queries its associated Package debug flag and the Environment debug flag. If both flags are on, then debug mode is activated.

There is a built-in pre-invocation accessibility test. Method access, including Type inquiring, event Delegate setting and Interface casting, on a Connector, which is an instance of a private Interface, is tested that the invocation source belongs to the same Package as that Interface. Event access is tested that the invocation source belongs to Connector's associated Instance. If those conditions are not met, an accessibility Exception would be thrown.

There is a built-in pre- and post-invocation check for testing the parameter Types and ranges and return value Type and range or the thrown Exception Type. Each pre-/post-invocation handler has the authority to allow or reject normal execution of an Operation implementation—therefore, those handlers "vote" on Operation's execution.

Validity and legality checks are performed on thrown Exceptions. Native, invalid and illegal exception objects are wrapped into an appropriate Exception. Legal Exceptions are enumerated by the Exception list declared by the Operation. Legal Exceptions are just propagated further to the Operation caller.

Figure 5:
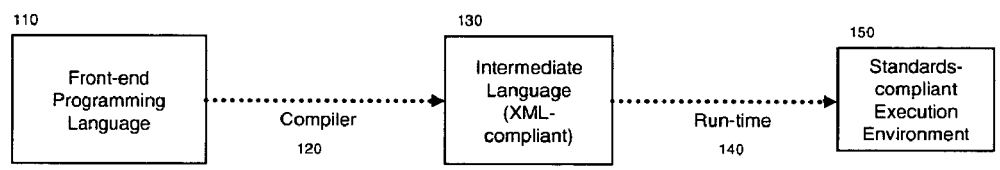
FIG. 5 is a block diagram illustrating the language's translation stages into an executing program.

The higher-level programming language, which features are described above, needs to be translated into data structures and instruction sequences natively understood be the scripting engine. The block diagram in FIG. 5 illustrates the language translation stages into an executing program.

As with other 3G languages, the front-end language code 110 is first compiled 120 into an XML-compliant intermediate language 130, which is the language described above. The compilation procedure 120 may include static code checking, various optimizations, expansion of macros and function overloading. It should be noted that front-end language (110) and its compilation (120) to the intermediate language (130) are out of the scope of the present invention. This patent deals only with the intermediate language (130) and its processing and support by the Runtime (140); the minimal execution environment (150) is provided only by standard software components and includes at least a scripting engine, a data processing engine and a communications engine. Runtime activities 140 include dynamic loading and linking of Types needed for the execution of a program, ECMAScript code generation and execution control. The Runtime may operate in the standard execution environment 150 in a fully operational mode or in a selective debug mode, performing Type and range checks at method invocation boundaries.

The Runtime's language processing and translation capabilities are based on the XML standard framework as described in FIG. 7. An XML vocabulary (XML-based language) exists for each type of processable XML-resource 320. Usually, each vocabulary is defined in its own namespace in order to prevent collisions when two or more vocabularies are used in the same document. Each vocabulary is defined by an XML-Schema (XSD) 330. There is at least one special transformation template (XSLT) 310 for each type of processable XML-resource. Following is a description of the resource processing as described in FIG. 7.

The processing aim of the present invention is to create a native data structure from the XML-resource 320. An additional aim is to provide additional rules and constraints, which cannot be enforced by using XML-Schema 330 alone.

In order to create that native data structure, the XML-resource 320 should be transformed into an ECMAScript literal. Following is an example of an XML-resource (XML overhead omitted):

```
<strings>
    <string name="MorningGreeting" value="Good morning!" />
    <string name="EveningGreeting" value="Good evening!" />
</strings>
This XML-resource would be transformed into:
<executable><![CDATA[
refId = {
    MorningGreeting: "Good morning!",
    EveningGreeting: "Good evening!"
}
]]></executable>
```

Further, the text data inside the CDATA section would be extracted as a string—that is the ECMAScript literal. If the above resource is referenced as a DOM-document tree, then:

scriptLiteral=textualize(executableDocument);

would set the "scriptiteral" variable to this string (extra whitespace removed):

"refId={MorningGreeting: "Good morning!", EveningGreeting: "Good evening!"}".

Further, that script literal must be loaded into the scripting engine—the ECMAScript engine supports this function:

eval(scriptLiteral);

Finally, the script engine compiles that literal and creates a "refId" variable that references an object that contains the above strings defined as properties—this can be proved by invoking the following function on the ECMAScript engine:

alert(refId.MorningGreeting);

would alert "Good morning!", since the property "MorningGreeting" of the ECMAScript object referenced by "refId" contains that string.

As illustrated in FIG. 8, the same process is applicable to every type of processable XML-resource 320; the only difference is the applied transformation 450 and the produced script literal 430.

The script literal 430 may be complex, as long as it is successfully compiled by the scripting engine. A full programming language can be defined as an XML vocabulary and a transformation template 450 can define the appropriate productions for it. For example, a conditional statement construct like:

```
<if>
    <condition>
        boolean-expression
    </condition>
    <true>
        code-block
    </true>
    <false>
        code-block
    </false>
</if>
``` would produce the following ECMAScript literal:

```
if( boolean-expression ) {
    code-block
}
else {
    code-block
}
```

The above production might be a part of a bigger production and/or contain other productions, which all together would be loaded into the scripting engine.

The transformation process can be made to enforce complex Type checking and Type-conversion rules.

Computer programs, which transform data into results, are expressed in some programming language. The supporting machine, which performs the instructions given by the program, gives the meaning to that programming language; without a supporting machine, that programming language would have no meaning. Any given programming language needs to rely on a supporting machine through which its meaning could be determined. A different programming language, which already has a supporting machine, can provide that supporting machine. That computer program can translate the said first programming language to an already supported second programming language, which would provide the runtime support required by the first language.

The T-diagram illustrated in FIG. 9 summarizes this concept for a hypothetical XML-compliant programming language (shortly XPL), processed and executed in standards-compliant programming environment. A computer program written in XPL 510 is used to transform data into results. A computer program written in XSLT 520, which is supported by the XSLT Engine 521, is used to transform the XPL computer program 510 into an identical ECMAScript computer program 530, which is supported by the XPL Run-time 531, which, in turn, is supported by the ECMAScript Engine 532. The resulting ECMAScript computer program 530 operates on the same data as the original XPL computer program 510 and generates the same results as expected from the original XPL computer program 510. The operation of the ECMAScript computer program 510 requires a special runtime support—the XPL Runtime 531. The XPL Runtime 531 provides services according to some XPL semantics—the preferred embodiment provides services such as Type-loading, Class instantiation, call interception, etc. as detailed above.

What is claimed is:

1. A Method for processing an XML-based programming language and executing an application built from multiple executable components written in that XML-based programming language, wherein for sustaining the execution at runtime, requiring a programming platform supporting at least the following standard specifications:
- a) the standard ECMAScript Language Specification as a means of executing instructions and providing volatile memory space;
- b) the standard DOM Level 2 Traversal and Range Specification and the DOM Level 2 Core Specification as a means of programmatically accessing and manipulating parsed XML resources; and
- c) the standard XSL Transformations as a means for transforming XML resources; said processing comprises in run-time the following steps:

pre-storing in one or more repositories said multiple executable components of the application;

loading and initializing a set of runtime system libraries from said one or more repositories, including the loading of environment description and resources for said application, and framing the application;

upon necessity by the execution path of said running application, dynamically loading one or more of said pre-stored executable components from said one or more repositories;

transforming each of said loaded executable components from said XML-based programming language into multiple literals of the ECMAScript programming language by applying dedicated transformation rules;

binding and loading each of said transformed components' literals into an ECMAScript engine in order to make said components and said runtime system libraries programmatically available one to another;

monitoring the execution of each component in order to detect potential defects, potential performance bottlenecks, and said necessity to load additional components;

wherein said XML-based programming language is at least capable of describing the following main entities:

a package that contains the package name, version, debug flag, programming platform compatibility rules and package dependency rules of a predetermined and fixed set of entities and their resources;

a class that contains the class name, version, inherited class and supported interfaces of a predetermined and fixed set of field definitions and operation implementations;

an interface that contains the interface name, version, inherited interface, and a predetermined and fixed set of constant and operation definitions;

an environment that contains the environment name, version, startup class, startup parameters, debug flag and site root of said application, and a startup function.

2. The method of claim 1 for use in a client/server environment, wherein the said repositories are located at the server side, and said programming platform is located and operates at a client end to service user interface requests and to manage said application display.

3. The method of claim 1 for use in a client/server environment, wherein the said repositories are located at the server side, and said programming platform is also located and operates at the server side, to service remote client requests by accessing other local or remote data sources and by applying various computations on them.

4. The method of claim 2 wherein said programming platform is located and operates at the client end, and is hosted by a Web browser.

5. The method of claim 1, wherein said application runs using at least one of said pre-stored executable components.

6. The method of claim 1 wherein each of said executable components is an opaque object described by a predetermined and fixed set of classes, accessible only through a predetermined and fixed set of connectors, each connector is described by an interface, whereas all said classes and interfaces are grouped into at least one package.

7. The method of claim 6, wherein said initializing step designates one of said classes as a startup class to be loaded first from said one or more repositories, in order to launch said application.

8. The method of claim 1 further comprising a mechanism for caching loaded executable components in order to avoid repeated loading of components.

9. The method of claim 1 wherein said programming platform is connected to external systems that are defined by additional standard or non-standard specifications.

10. The method of claim 7 wherein said programming platform provides an initializing mechanism for the purpose of preparing the environment required for the execution of the application by instantiating said startup class of said application.

11. The method of claim 1 wherein said programming platform provides a loading mechanism for the purpose of loading said executable components.

12. The method of claim 1 wherein said programming platform provides a class instantiation mechanism for the purpose of bringing said loaded executable components into their running state in order to enable their operation.

13. The method of claim 1 wherein said programming platform provides a call interception mechanism for the purpose of monitoring each operation of said executable component in order to ensure meeting said operation definition and to calculate the average completion time.

14. The method of claim 1, wherein said programming platform comprises a core, and wherein said core is described by said environment as a set of statically loaded libraries written in the ECMAScript programming language.

15. The method of claim 14, wherein a life-cycle of said application comprises the following events:
bootstrapping said programming platform in order to begin said application working session; and
shutting down said programming platform in order to terminate said application working session.

16. The method of claim 15 wherein said bootstrap process comprises the following steps:
loading said environment;
initializing the core of said programming platform by executing said startup function;
instantiating the startup class of said environment to form a startup object;
initializing said startup object by passing said startup parameters as defined by said environment.

17. The method of claim 16, wherein said shutting down process comprises the disposal of said startup object.

18. The method of claim 17, wherein said working session is confined by the initialization of said startup object and disposal events, while the handling of these events is application specific and includes any of the operations supported by the said programming platform itself and by systems externally connected to it.

* * * * *